US012757152B2

(12) United States Patent
Kucera et al.

(10) Patent No.: US 12,757,152 B2
(45) Date of Patent: Oct. 6, 2026

(54) ASSISTANCE DATA UPDATE BASED ON POSITIONING REFERENCE SIGNALS AND SYNCHRONIZATION SIGNAL BLOCK SIGNALS

(71) Applicant: Nokia Technologies Oy, Espoo (FI)

(72) Inventors: Stepan Kucera, Munich (DE); Mikko Säily, Espoo (FI); Diomidis Michalopoulos, Munich (DE); Timo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 255 days.

(21) Appl. No.: 18/556,451

(22) PCT Filed: Apr. 13, 2022

(86) PCT No.: PCT/EP2022/059887
§ 371 (c)(1),
(2) Date: Oct. 20, 2023

(87) PCT Pub. No.: WO2022/238080
PCT Pub. Date: Nov. 17, 2022

(65) Prior Publication Data

US 2024/0196360 A1 Jun. 13, 2024

(30) Foreign Application Priority Data

May 10, 2021 (FI) ..................................... 20215549

(51) Int. Cl.
*H04W 64/00* (2009.01)
*H04L 5/00* (2006.01)
(Continued)

(52) U.S. Cl.
CPC ........... *H04W 64/00* (2013.01); *H04L 5/0051* (2013.01); *H04W 24/08* (2013.01); *H04W 36/08* (2013.01); *H04W 56/0015* (2013.01)

(58) Field of Classification Search
CPC ..... H04W 64/00; H04W 24/08; H04W 36/08; H04W 56/0015; H04L 5/0051
(Continued)

(56) References Cited

U.S. PATENT DOCUMENTS 11,606,771 B2 * 3/2023 Lee ..................... H04W 64/003
2009/0181698 A1 * 7/2009 Farmer ................... H04W 4/20 455/456.3
(Continued)

FOREIGN PATENT DOCUMENTS

CN 102474842 A 5/2012
CN 103238356 A 8/2013
(Continued)

OTHER PUBLICATIONS

Office action received for corresponding Indian Patent Application No. 202347074548, dated Mar. 10, 2025, 6 pages.
(Continued)

*Primary Examiner* — John A Follansbee
(74) *Attorney, Agent, or Firm* — Lippes Mathias LLP

(57) ABSTRACT

An apparatus comprising means for monitoring, by a wireless device. Positioning Reference signals, PRSs, and/or Synchronization Signal Block, SSB, signals of at least one cell of a wireless communications network based on one or more criteria for a positioning assistance data update to a wireless device; and means for transmitting, by the wireless device, based on at least one of the criteria has been met, a request for positioning assistance data update to the wireless communications network.

20 Claims, 4 Drawing Sheets

(51) Int. Cl.
*H04W 24/08* (2009.01)
*H04W 36/08* (2009.01)
*H04W 56/00* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2011/0039576 | A1* | 2/2011 | Prakash | G01S 5/0236 455/456.1 |
| 2012/0083288 | A1 | 4/2012 | Siomina | |
| 2018/0317111 | A1 | 11/2018 | Agnihotri et al. | |
| 2020/0107209 | A1 | 4/2020 | Ratasuk et al. | |
| 2020/0229130 | A1 | 7/2020 | Keating et al. | |
| 2020/0264261 | A1 | 8/2020 | Akkarakaran et al. | |

FOREIGN PATENT DOCUMENTS

| | | | |
|---|---|---|---|
| CN | 110476454 | A | 11/2019 |
| CN | 111034295 | A | 4/2020 |
| CN | 111630910 | A | 9/2020 |
| CN | 112243575 | A | 1/2021 |
| CN | 112292830 | A | 1/2021 |
| EP | 3621351 | A1 | 3/2020 |
| WO | 2011/019917 | A1 | 2/2011 |
| WO | 2017/184040 | A1 | 10/2017 |
| WO | 2019/074417 | A1 | 4/2019 |
| WO | 2020/145727 | A1 | 7/2020 |
| WO | 2021/023912 | A1 | 2/2021 |
| WO | 2021/254591 | A1 | 12/2021 |
| WO | 2022/073215 | A1 | 4/2022 |

OTHER PUBLICATIONS

"Revised WID on NR Positioning Enhancements", 3GPP TSG RAN Meeting #91e, RP-210903, Agenda: 9.7.25, Intel Corporation, Mar. 16-26, 2022, 6 pages.

"Revised WID on NR Positioning Enhancements", 3GPP TSG RAN Meeting #91e, RP-210897, Agenda: 9.7.25, Intel Corporation, Mar. 16-26, 2022, 6 pages.

"3rd Generation Partnership Project; Technical Specification Group Radio Access Network; LTE Positioning Protocol (LPP (Release 16)", 3GPP TS 37.355, V16.4.0, Mar. 2021, pp. 1-298.

"3rd Generation Partnership Project; Technical Specification Group Services and System Aspects; Service requirements for the 5G system; Stage 1 (Release 18)", 3GPP TS 22.261, V18.2.0, Mar. 2021, 85 pages.

"3rd Generation Partnership Project; Technical Specification Group Radio Access Network; NR; Physical layer procedures for data (Release 16)", 3GPP TS 38.214, V16.5.0, Mar. 2021, pp. 1-171.

"5G; NR; Physical channels and modulation (3GPP TS 38.211 version 16.2.0 Release 16)", ETSI TS 138 211, V16.2.0, Jul. 2020, 136 pages.

"5G; NR; Physical layer procedures for data (3GPP TS 38.214 version 16.2.0 Release 16)", ETSI TS 138 214, V16.2.0, Jul. 2020, 167 pages.

"5G; NR; Physical layer measurements (3GPP TS 38.215 version 16.2.0 Release 16)", ETSI TS 138 215, V16.2.0, Jul. 2020, 30 pages.

"3rd Generation Partnership Project; Technical Specification Group Radio Access Network; NR; Requirements for support of radio resource management (Release 15)", 3GPP TS 38.133, V15.3.0, Sep. 2018, pp. 1-136.

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

Office action received for corresponding Finnish Patent Application No. 20215549, dated Nov. 11, 2021, 9 pages.

"Views on potential positioning enhancements", 3GPP TSG RAN WG1 #103-e, R1-2008301, Agenda: 8.5.3, Nokia, Nov. 1, 2020, 13 pages.

Office action received for corresponding Finnish Patent Application No. 20215549, dated Feb. 16, 2022, 4 pages.

International Search Report and Written Opinion received for corresponding Patent Cooperation Treaty Application No. PCT/EP2022/059887, dated Jul. 15, 2022, 12 pages.

Office action received for corresponding Chinese Patent Application No. 202280034081.X, dated Apr. 28, 2026, 11 pages of office action and 10 pages of translation available.

* cited by examiner

ASSISTANCE DATA UPDATE BASED ON POSITIONING REFERENCE SIGNALS AND SYNCHRONIZATION SIGNAL BLOCK SIGNALS

RELATED APPLICATION

This application claims priority to PCT Application No. PCT/EP2022/059887, filed on Apr. 13, 2022, which claims priority to FI Application No. 20215549, filed on May 10, 2021, each of which is incorporated herein by reference in its entirety.

TECHNICAL FIELD

The present invention relates to the field of wireless communications and, more particularly, to assistance data update based on monitoring positioning reference signals and synchronization signal block signals.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

3GPP NR Rel-16 for 5th Generation (5G) New Radio (NR) introduced a new reference signal, known as the Positioning Reference Signal (PRS), for supporting downlink based positioning. User Equipment (UE) may perform downlink reference signal time difference measurements based on PRSs from multiple base stations. Based on the received PRS the UE may perform time of arrival (ToA) and Reference Signal Time Difference (RSTD) estimation and report the ToA and RSTD results to a location server, e.g. Location Management Function (LMF).

Assistance data (AD) enables UEs to synchronize to PRSs from base stations. UEs may receive the AD provided it is in Radio Resource Control protocol (RRC) connected state and stationary. However, for UEs that are not in RRC Connected state and/or for UEs that are moving, delivery of the AD is challenging, because UEs may be lacking PRS configuration information or the PRS configuration information of UEs may be outdated.

SUMMARY

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

Now, an improved method and technical equipment implementing the method has been invented, by which at least the above problems are alleviated. Various aspects include a method, an apparatus, a computer program and a non-transitory computer readable medium, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided an apparatus comprising at least one processor and at least one memory, the apparatus being configured to cause:

monitor, by a wireless device, Positioning Reference Signals, PRSs, and/or Synchronization Signal Block, SSB, signals of at least one cell of a wireless communications network based on one or more criteria for a positioning assistance data update to a wireless device; and transmit, by the wireless device, based on at least one of the criteria has been met, a request for positioning assistance data update to the wireless communications network.

According to a second aspect there is provided an apparatus comprising at least one processor and at least one memory, said at least one memory stored with computer program code thereon, the at least one memory and the computer program code configured to, with the at least one processor, cause the apparatus at least to perform:

monitor, by a wireless device, Positioning Reference Signals, PRSs, and/or Synchronization Signal Block, SSB, signals of at least one cell of a wireless communications network based on one or more criteria for a positioning assistance data update to a wireless device; and transmit, by the wireless device, based on at least one of the criteria has been met, a request for positioning assistance data update to the wireless communications network.

According to an embodiment, the apparatus according to the first and second aspect is configured to cause determining the positioning data update based on the received request.

According to an embodiment, the monitored PRSs are based on a PRS configuration of the at least one cell and/or SSB signals quasi co-located with the PRSs of the PRS configuration.

According to an embodiment, the request for positioning assistance data update comprises a Small Data Transmission or a Radio Access Network based Notification Area Update.

According to an embodiment, the Radio Access Network based Notification Area Update comprises a cause value indicating the positioning assistance data update.

According to an embodiment, the wireless device has a Radio Resource Control protocol state Idle, Inactive or Connected.

According to an embodiment, the one or more criteria for a positioning assistance data update to a wireless device comprise at least one of triggering criteria and blocking criteria.

According to an embodiment, the apparatus according to the first and second aspect is configured to cause:

transmit, by the wireless device, the request for positioning assistance data update to the wireless communications network based on determining at least one of the triggering criteria have been met without any of the blocking criteria being met.

According to an embodiment, the triggering criteria are based on one or more of time, expiry of a periodic timer, a cell selection event, a power level of a monitored SSB signal, a power level of a monitored PRS, a periodicity of a monitored PRS, an occasion duration of a monitored PRS, a need for Radio Access Network Notification Area update, a number of PRSs meeting a quality level, positioning accuracy, a change of a UE context and a change of a positioning method.

According to an embodiment, the blocking criteria are based on one or more of time, a silence period from a previous assistance data update, a Radio Resource Control protocol state change and a velocity of the wireless device.

According to an embodiment, the apparatus according to the first and second aspect is configured to cause:

transmit, by the wireless device, the request for positioning assistance data update on each cell re-selection.

According to an embodiment, the request for positioning assistance data update comprises information related to at least one of a Radio Resource Control protocol state of the wireless device, measurement results of the monitored PRSs and/or SSB signals, one or more cell identifiers, one or more RNA identifiers and a positioning method applied at the wireless device.

According to a third aspect, there is provided an apparatus comprising at least one processor and at least one memory, the apparatus being configured to cause:

configure, by an access node of a radio access network, one or more criteria for a positioning assistance data update to a wireless device based on monitoring Positioning Reference Signals, PRSs, and/or Synchronization Signal Block, SSB, signals of at least one cell of a wireless communications network;

receive, by the access node, a request for positioning assistance data update from the wireless device; and deliver, by the access node, a positioning assistance data update to the wireless device based on the request.

According to a fourth aspect there is provided an apparatus comprising at least one processor and at least one memory, said at least one memory stored with computer program code thereon, the at least one memory and the computer program code configured to, with the at least one processor, cause the apparatus at least to perform:

configure, by an access node of a radio access network, one or more criteria for a positioning assistance data update to a wireless device based on monitoring Positioning Reference Signals, PRSs, and/or Synchronization Signal Block, SSB, signals of at least one cell of a wireless communications network;

receive, by the access node, a request for positioning assistance data update from the wireless device; and deliver, by the access node, a positioning assistance data update to the wireless device based on the request.

According to an embodiment, the apparatus according to the third and fourth aspect is configured to cause:

determine, by the access node, to approve the received request for positioning assistance data update based on one or more conditions; and deliver, by the access node, the positioning assistance data update based on a positive approval of the request.

According to an embodiment, the apparatus according to the third and fourth aspect is configured to cause:

deliver, by the access node, the positioning assistance data update to the wireless device as part of an existing communications session based on a current Radio Resource Control protocol state of the wireless device; or deliver, by the access node, the positioning assistance data update to the wireless device as part of a new communications session based on the current Radio Resource Control protocol state of the wireless device or based on a changed Radio Resource Control protocol state of the wireless device.

According to an embodiment, the apparatus according to the third and fourth aspect is configured to cause:

approve, by the access node, the received request for positioning assistance data update based on a lack of response from a location management function and rejected based on a context retrieval after expiry of assistance data has been confirmed based on Radio Access Network based Notification Area Update.

According to a fifth aspect there is provided a method comprising:

monitoring, by a wireless device, Positioning Reference Signals, PRSs, and/or Synchronization Signal Block, SSB, signals of at least one cell of a wireless communications network based on one or more criteria for a positioning assistance data update to a wireless device; and transmitting, by the wireless device, based on at least one of the criteria has been met, a request for positioning assistance data update to the wireless communications network.

According to a sixth aspect there is provided a method comprising:

configuring, by an access node of a radio access network, one or more criteria for a positioning assistance data update to a wireless device based on monitoring Positioning Reference Signals, PRSs, and/or Synchronization Signal Block, SSB, signals of at least one cell of a wireless communications network;

receiving, by the access node, a request for positioning assistance data update from the wireless device; and delivering, by the access node, a positioning assistance data update to the wireless device based on the received request.

According to a seventh aspect there is provided a computer program comprising instructions for causing an apparatus to perform at least the following:

monitor, by a wireless device, Positioning Reference Signals, PRSs, and/or Synchronization Signal Block, SSB, signals of at least one cell of a wireless communications network based on one or more criteria for a positioning assistance data update to a wireless device; and transmit, by the wireless device, based on at least one of the criteria has been met, a request for positioning assistance data update to the wireless communications network.

According to an eighth aspect there is provided a non-transitory computer readable medium comprising program instructions for causing an apparatus to perform at least the following:

monitor, by a wireless device, Positioning Reference Signals, PRSs, and/or Synchronization Signal Block, SSB, signals of at least one cell of a wireless communications network based on one or more criteria for a positioning assistance data update to a wireless device; and transmit, by the wireless device, based on at least one of the criteria has been met, a request for positioning assistance data update to the wireless communications network.

According to a ninth aspect there is provided a computer program comprising instructions for causing an apparatus to perform at least the following:

configure, by an access node of a radio access network, one or more criteria for a positioning assistance data update to a wireless device based on monitoring Positioning Reference Signals, PRSs, and/or Synchronization Signal Block, SSB, signals of at least one cell of a wireless communications network;

receive, by the access node, a request for positioning assistance data update from the wireless device; and deliver, by the access node, a positioning assistance data update to the wireless device based on the received request.

According to a tenth aspect there is provided a non-transitory computer readable medium comprising program instructions for causing an apparatus to perform at least the following:

configure, by an access node of a radio access network, one or more criteria for a positioning assistance data update to a wireless device based on monitoring Positioning Reference Signals, PRSs, and/or Synchronization Signal Block, SSB, signals of at least one cell of a wireless communications network;

receive, by the access node, a request for positioning assistance data update from the wireless device; and deliver, by the access node, a positioning assistance data update to the wireless device based on the received request.

BRIEF DESCRIPTION OF THE DRAWINGS

For a more complete understanding of the example embodiments, reference is now made to the following descriptions taken in connection with the accompanying drawings in which.

DETAILED DESCRIPTION OF SOME EXAMPLE EMBODIMENTS

Figure 1:
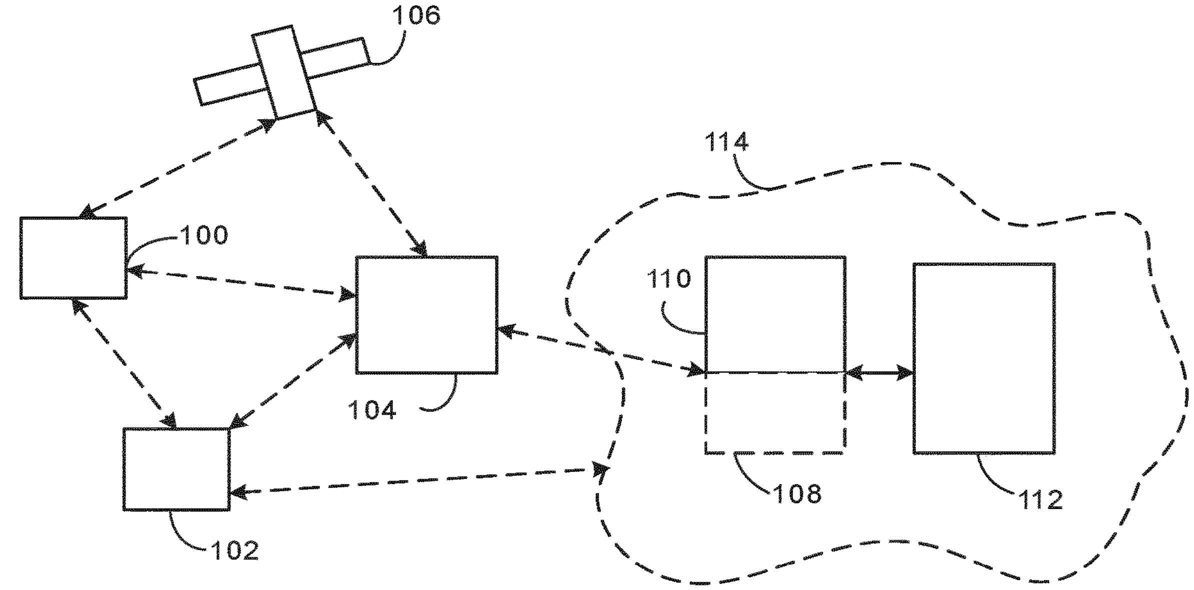
FIG. 1 shows a part of an exemplifying radio access network.

Use of ordinal terms such as "first," "second," "third," etc., in the claims and description to modify a described feature does not by itself connote any priority, precedence, or order of one described feature over another or the temporal order in which acts of a method are performed, but are used merely as labels to distinguish one described feature having a certain name from another described feature having a same name (but for use of the ordinal term) to distinguish the described feature.

There is provided updating assistance data, or positioning assistance data, for positioning by monitoring Positioning Reference Signals, PRSs, and/or Synchronization Signal Block, SSB, signals of at least one cell of a wireless communications network based on one or more criteria for an assistance data (AD) update to a wireless device. Based on at least one of the criteria being met, a request for positioning assistance data update to the wireless communications network is transmitted. The assistance data may be updated at a wireless device. The wireless device may be in RRC Idle, RRD Inactive, or RRC Connected state. The updating of the AD is provided in any RRC state supported by 3GPP the Release 17 Specifications. The wireless device may maintain one or more PRS configurations which may be updated based on updating the AD.

In an example scenario, where the AD updating is useful, comprises that a wireless device in RRC Connected state is provided with a configuration to measure PRS while in RRC Inactive state. The configuration of the wireless device to measure PRS may be performed before a state change of the wireless device from the RRC Connected state to RRC Inactive state. However, changes on the PRS configurations may happen without the wireless device being informed of such changes. The PRS configurations may have changed e.g. due to an on-demand PRS by other wireless devices and/or due to mobility of the wireless device. therefore, the PRS configuration changes are not necessarily informed to the wireless device that is not in RRC Connected state. In such a case the PRS configuration stored at the wireless device does not correspond to actual PRS resources, but to outdated PRS resources. Therefore, AD updating that may be performed preferably in any RRC state provides that the PRS configuration at the wireless device is up to date.

An underlying principle for the examples described herein is two-fold. Firstly, a wireless device may monitor pre-configured PRS resources as well as SSB signals as convenient substitutes for estimating the quality of unknown PRS resources, and use the monitoring results to trigger timely requests for AD updates. These requests initiated by the wireless device indicate to the network that there are wireless devices that require an AD update for positioning which is particularly useful for wireless devices in RRC Inactive state. Secondly, the network may perform targeted AD updates to wireless devices indicating the need for an AD update. The network can either continue a communications session triggered by a wireless device in order to deliver the AD update, or start a separate independent communication session by using an identifier of the wireless device, e.g. the UE ID, acquired during the communications session triggered by the wireless device. This is helpful when the wireless device undergoes an RRC state change or AD payload exceeds the capabilities, e.g. a size limit, of the communications session triggered by the wireless device.

The underlying principle for the examples described now described in more detail for wireless devices, e.g. UEs, that are configured to communicate with an access node of a radio access network, e.g. a gNB. The network, or the gNB, may configure so-called trigger and blocking conditions to the UEs. These conditions refer to when and under which circumstances the UE should trigger a request for obtaining an update of the AD. The UEs initiate an AD update request, either irrespective or based on the current RRC state, based on the trigger and blocking conditions. The independence from direct real-time control by network gNBs is particularly advantageous for UEs in RRC Inactive state. As described in Examples, these conditions are primarily related to PRS and SSB evaluation, UE mobility and are designed to ensure timely AD updates from the most suitable cells.

In one or more examples described herein, if PRS is measured by a UE to be too weak, for example, compared with one or more specified thresholds (e.g. signal quality threshold such as RSRP/SINR threshold), the UE may select a new camped-on a strong SSB detected with known PRS co-location. The strong SSB may be determined based on a comparison with the weak PRS and/or one or more thresholds.

In one or more examples described herein, one or more criteria/conditions for triggering the UE to transmit a request for AD update can be specific an RRC Inactive state of the UE and the UE can request for an AD update by using explicit signaling, e.g. using SDT payload and/or implicit signaling, e.g. using RNAU. To validate/approve the request and/or selectively reply only to UEs actively engaged in positioning sessions, the network may perform its own network-side assessment of the request. It should be noted that the UE in the RRC Inactive state may have a configuration for positioning measurements, e.g. a PRS configuration.

In one or more examples described herein, an RNA update message serves for a request for AD update.

In one example, of using an RNA update message for requesting an AD update, when UE is in RRC Inactive state and has an on-going positioning measurements/positioning session, it may be configured to trigger RNAU upon every cell re-selection (instead of only when re-selecting to a cell outside of current RNA or to different RNA). When UE triggers RNA update within the same RNA it may use a special cause value to indicate to NW that it requires (or requests) AD update. In one example, UE may be configured to indicate each of the cell re-selection to NW (using RNAU and in some examples when UE re-selects the cell within same RNA). In one example, UE may trigger RNA update without re-selecting to a new cell (or to a new RNA) when it requires update the for AD. This configuration may be specific for when UE is performing positioning measurements (e.g. in INACTIVE mode).

In one example, of using an RNA update message for requesting an AD update, when UE is in RRC Inactive state and has an on-going positioning measurements/positioning session the UE may use the RNA update message on a cell that is not currently selected for requesting AD update. The cell may be re-selected by the UE for camping, i.e. for a camped-on cell. RNA update message comprise a special cause value which indicates that the UE requests an AD update for the cell/cells in RNA area or for one or more RNA areas but the UE does not do a cell re-selection. This maybe allowed within the specific RNA area, or across sets of RNA areas. Requesting AD on specific cell may cause the network to update AD data for one or more cells.

In one example, of using an RNA update message (i.e. the RRCResumeRequest with resume cause value indicating the rna-update) for requesting an AD update, the network may configure in a system information block (SIB) whether a UE is allowed use an RNA update for each cell-reselection where the cell re-selection may select cell within the same RNA. UE may determine based on system information received in the SIB whether it is allowed to use the RNA update message for an AD request. Alternatively, the network may configure the UE based on an RRC message, e.g. an RRCRelease message, to be allowed to send an RNA update on each cell re-selection. The RNA update may comprise a special cause value to request AD update. This may be in response when the UE has indicated to the NW that it performs positioning measurements/reporting in inactive mode. In one example, the network may explicitly indicate to UE the RNA area IDs where UE can use the AD request by using the RNA update message.

In one example, of using an RNA update message (i.e the RRCResumeRequest with resume cause value indicating the RNA update) for requesting an AD update, the network may configure a UE to perform an RNA update on each re-selection. The RNA update may be performed by the UE regardless of whether the RNA area is changed/is different for the re-selected cell, when UE has been configured to perform positioning measurement/reporting in in active mode. It should be noted that the UE may normally perform an RNA update when the UE leaves a designate group of cells, e.g. a so-called RAN Notification Area, or RNA. As a difference to this normal operation it is suggested herein that the UE may perform an RNA update every time the UE changes its camped-on cell, even if the RNA of a new camped-on cell and a previous camped-on cell would be the same, in which case the RNA update is auxiliary. The RNA update message may comprise a cause value, e.g. RNA-Update, whereby the RNA update message does not have an explicit indication of an AD update request. The network may determine based on the RNA update message whether the UE should be provided with new AD data, or an AD update.

In any of the examples herein, the QCL assumption or QCL relationship may refer to a signal property shared by the QCL'd reference signals. The QCL assumption may be configured by the network. As an example, the 38.214 defines currently following types of QCL information:

The quasi co-location types corresponding to each DL RS are given by the higher layer parameter qcl-Type in QCL-Info and may take one of the following values:
- 'typeA': {Doppler shift, Doppler spread, average delay, delay spread}
- 'typeB': {Doppler shift, Doppler spread}
- 'typeC': {Doppler shift, average delay}
- 'typeD': {Spatial Rx parameter}

As a further example, downlink reference signals such as SSB and PRS are configured with same qcl-Type (e.g. typeD) it indicates to UE that the signals can be received using the same spatial RX filter (RX beam).

In any of the examples herein, one or more conditions/criteria for triggering/causing the RNA update message may be combined with one or more other trigger conditions/criteria, e.g. if the UE determines based on a trigger condition that it requires an AD update, it may trigger RNA update within cell that is the camped-on cell of the UE.

In one further example embodiment regarding the use of RNA update message for AD update delivery, the following is considered:

- In one example, when UE in inactive state and has on-going positioning measurements/positioning session, it may be configured to trigger RNAU upon every cell re-selection (instead of only when re-selecting to a cell outside of current RNA or to different RNA). When UE triggers RNA update within the same RNA it may use special cause value to indicate to NW that it requires AD update in addition to RNA update.
- In one example, when UE in inactive state and has on-going positioning measurements/positioning session UE use the RRCResumeRequest message on a cell that is not currently selected (re-selected for camping) for requesting AD update. This may be achieved by using a special cause value which indicates that UE requests AD update for the cell/cells in RNA area or for one or more RNA areas but does not do a re-selection this maybe allowed within the specific RNA area or across sets of RNA areas
  - requesting AD on specific cell may cause NW to update AD data for one or more cells
- In one embodiment, NW can configure in system information (SIB) whether UE is allowed use RNA update for each cell-reselection where the cell re-selection may select cell within the same RNA. UE may determine based on SI whether it is allowed to use the RNA update message for AD request.

- Alternatively, network may configure UE with RRCRelease message to be allowed to send RNA update on each cell re-selection (with a special cause value to request AD update). This may be in response when UE has indicated to NW that it performs positioning measurements/reporting in inactive mode.
  - in one example, NW may explicitly indicate to UE the RNA area IDs where UE can use the AD request by using the RNA update message.
- In one example, NW may configure UE to perform RNA update on each re-selection (regardless of whether the RNA area is changed/is different for the re-selected cell), when UE has been configured to perform positioning in measurement/reporting in active mode. RRCResumeRequest cause value may be e.g. RNA-Update without explicitly indication of AD update request. NW may determine based on the update message whether UE should be provided with new AD data.
- In any of the examples herein, the RNA update trigger condition maybe combined with other trigger condition e.g. if UE determines based on an example trigger condition herein that it requires AD update, it may trigger RNA update within the camped cell.

In any of the embodiments herein, the request for AD update may comprise an SDT or RNA update. As an example, an SDT-based request for AD update may be blocked by the network if the payload exceeds an SDT limit and/or the UE is commanded to resume in RRC Connected state. As an example, for an implicit RNAU-based request, in response to receiving the RNAU-based request by a gNB, the camped-on gNB retrieves, based on UE identifier derived from the RNAU-based request, UE context from a previously serving gNB. The UE context comprises PRS configuration of the UE which enables the gNB to identify whether the UE is an actively positioning UE or not, e.g. an inactive or non-positioning UE, based on an AD of the retrieved PRS configuration. If the AD of the retrieved PRS configuration is expired, or out-of-date, the UE may be determined to be an inactive or non-positioning UE.

In an example, if the AD update request from the UE is approved, the network may choose to either

- reuse the initial UE-triggered communication session to deliver the AD update, e.g. continue in the UE-initiated SDT/RNAU communications, or
- start new communications that possibly involve a different RRC state and/or delivery mechanism but leverage information acquired during the initial UE-triggered session
  - (e.g. the UE identity parameters acquired during the UE-triggered communications are used for subsequent paging of an RRC Inactive UE with the right UE ID to for example enable RRC Connected communications for the transfer of a long AD).

In any of the examples herein, gNB may decide to reject the RRCResumeRequest, keep the UE in RRC Inactive and indicate to use the same AD configuration.

EXAMPLES OF UE AND NETWORK FUNCTIONALITIES FOR UPDATING AD AT UE

Example 1

The example comprises the following measures:

- NW configures triggering and blocking conditions for AD update to UE(s)
  - The configuring may be performed at latest during RRC_Suspend for RRC_INACTIVE UEs who request via SDT
  - The trigger and blocking conditions provide may comprise that the AD update is transmitted if at least one of the trigger conditions is valid while no blocking condition is active.
- The triggering conditions can be based on time
  - expiry of periodic timer, e.g. T380 that forces RNA updates cell type
  - cell reselection event like camping on new cell
  - SSBs of camped-on/neighbouring cells is stronger/weaker than some pre-defined threshold, e.g. currently measured PRS strength, pre-defined constant possibly adjusted by hysteresis
  - Configured PRS periodicity at UE side does not meet measured periodicity of actually measured PRS, e.g. PRS is repeated too seldom with respect to the configured periodicity while UE was in connected state
  - Measured PRS occasion duration, or equivalently the number of consecutive PRS subframes, does meet the configured value for PRS occasion duration
- RNA
  - RNA update
  - departing/approaching/entering pre-defined subset of RNA cell PRS quality (e.g. in terms of signal quality such as RSRP/SINR or the like)
  - PRS stronger/weaker than a threshold value, possibly accounting hysteresis
  - insufficient PRS repetition in time with respect to some latency constraint
  - insufficient number of PRS having minimum quality positioning method
  - minimum required accuracy not achieved
  - a change of a UE context
  - positioning method change
- The blocking conditions that may override the triggering conditions, may be based on
  - time
    - active silence period from last AD update
  - RRC
    - expected/planned/ongoing RRC transition (RRC_INACTIVE: close to PO, or having been paged, ongoing RACH/SDT/RNAU)
  - UE velocity
    - maximum UE velocity, expected/planned/ongoing HO.
- When at least one trigger condition and absence of all/selected blocking conditions is satisfied, a trigger is defined for the UE to proactively request an AD update from the network. In such a case, the UE is caused to transmit a request for AD update to the network. For example, if a PRS strength condition and a RNAU event condition (two trigger conditions) are satisfied within a pre-defined "silence" period form the last AD update (blocking condition), then the AD update is requested only when the "silence" period is over. The validity of said initial trigger conditions can be then re-evaluated if desirable.
- When requesting an AD update by the UE, e.g. when using SDT/RNAU), the UE preferably chooses a communication method preserving its RRC state. In an example, the UE may append the request for AD update to an LPP message and delivering it via SDT/RNAU session in RRC_INACTIVE state. The request for AD update may also comprise information related to the UE's
RRC state (e.g. to make the LMF aware of it)
SSB/PRS measurements (e.g. measurement results, sufficiency of existing PRS resources)
positioning method (e.g. current accuracy, required PRS)

The request for AD update from the UE may be validated, or approved, by the network based on a set of
rejection conditions, e.g. no response from LMF, gNB or other network entity, within max inactivity time,
approval conditions, e.g. context retrieval after RNAU confirms expired AD), and the network may deliver an AD update, if approved/validated, to the UE as part of the
initial UE-triggered session, e.g. the LPP-based request is forwarded via SDT and the AD update is delivered over the associated SDT response,
new session, involving possibly different RRC state/delivery mechanism but derived from initial UE-triggered session, e.g. the network may
terminate UE's RNAU session by using conventional Release message but subsequently selectively pages the UE using its identity acquired during RNAU and delivers the AD update while preserving the UE's RRC_INACTIVE state, or
trigger a transition to RRC_CONNECTED as the AD update payload exceeds the max SDT limit.

Example 2

This example assumes that the network
divides PRS resources into so-called PRS sets, e.g. corresponding to standard PRS layers, comprising at least one PRS resource, and
dynamically activates and/or de-activates PRS resources to optimize positioning services. Preferably, all PRS resources in a given PRS set are (de)activated at the same time.

Using legacy signaling, UE in RRC_CONNECTED state acquires from a serving cell of the UE the definition of the UE RNA as well as the information on
PRS configuration
PRS/SSB quasi co-location (QCL)

for serving/neighboring cells, preferably for all cells in UE RNA. In general, the two information types do not necessarily relate to the same cell(s).

Once in RRC_INACTIVE state, the UE may monitor both SSB and PRS signals of camped-on/neighboring cells:
known pre-configured PRS resources and acquired SSB signals are measured directly by the UE
unknown PRS resources with indicated SSB QCL information are evaluated by the UE based on substitution measurements of the QCL-ed SSBs,
a PRS set is assumed to be active from
set activity indication—delivered to UE explicitly via network signaling for one or more cells (e.g. broadcast), and/or
set activity confirmation—determined by the UE implicitly from the activity of at least one "representative" PRS resource and/or QCL-ed SSB resource.

To this end, the network may indicate, or the UE may otherwise know, whether
an (in)active PRS resource indicates that all the PRS resources in an associated PRS set are (in)active too,
the presence of an SSB signal implies that the QCL-ed PRS resource(s) are active too.

The RRC_INACTIVE UE may further detect situations when
number of PRS resources, where this refers to time and frequency resources including periodicity, is not sufficient, e.g. less than a minimum required number of PRS resources is available,
quality of PRS resources is not acceptable e.g. a certain number of PRSs are below pre-defined threshold/not decodable/deactivated,
configuration of new/suitable/alternative PRS is not known, e.g. actively used PRS weaker than SSB with QCL-ed PRS of unknown configuration, or configuration of all PRS resources in a (presumably) active PRS set is not available,
periodic/persistent event is triggered, e.g. based on T380 timer, and the UE may address these situations by requesting info on configuration of new/additional PRS resources, preferably selectively from cell(s) known to provide the most suitable unknown PRS resources, e.g. from a cell with strong (in terms of signal quality such as RSRP/SINR) SSBs that co-locates PRSs of unknown config or deactivated part of the PRS set associated with the co-located PRS, by using uplink messaging such as
RNAU, or new registration,
and/or
SDT, or PRACH for on-demand system information.

To differentiate from legacy RNAU/SDT messages, network updates information on PRS configuration only at those UEs
whose RNAU/SDT message indicates need for updating information on PRS configuration, e.g. generic flag indicating that UE engages in localization activity, e.g. concrete request for updating config info on PRS, QCL-ed with particular SSB,
for whom the source gNB indicates outdated/insufficient information on PRS config, e.g. obtained via XnAP Retrieve UE Context upon RNAU.

System Information Block (SIB) referred to herein are transmitted by gNB using BCCH mapped on DL-SCH which in turn mapped on PDSCH. System Information Blocks are composed of 11 other blocks where each block contains specific information which is required for the UE to perform cell selection, re-selection, handover etc.

Synchronization Signal Block (SSB), also herein referred to an SSB signal, comprises a synchronization signal component and a Physical Broadcast Channel (PBCH) component. The synchronization signal component comprises a Primary Synchronization Signal (PSS) and a Secondary Synchronization Signal (SSS), and the PBCH component comprises PBCH Demodulation Reference Signal (DMRS) and PBCH (Data). TS 138 211 v16 may be referred to for the SSB.

Radio Resource Control (RRC) protocol is an air interface protocol between a wireless device and an access node of a radio access netowrk, e.g. between UE and gNB. the RRC may be referred to in TS 38.331 for 5G New Radio. The wireless device or UE may be in RRC Idle (RRC_IDLE) state, RRC Inactive (RRC_INACTIVE) state or RRC Connected (RRC_CONNECTED) state.

Assistance data (AD), or positioning AD, referred to herein comprises assistance data for positioning a wireless device, or UE. The AD may be for a satellite signal based positioning. Such satellite signals may comprise satellite signals transmitted in a GNSS, like GPS, GLONASS, GALILEO, SBAS, QZSS, LAAS or a combination of these. LAAS makes use of pseudolites instead of true satellites, but these pseudolites are to be understood to be covered as well by the term satellite as used in this application. LAAS has the advantage that it enables a positioning under indoor conditions as well. For supporting a GNSS based positioning, for example, assistance data may comprise, but is not limited, navigation models, time assistance, reference location, atmosphere models, differential corrections, sensor assistance and acquisition assistance, position information, high-accuracy position, information, multi-frequency multi-GNSS measurement data, sensor measurements, route information and waypoint information. It is to be understood that assistance data may also be provided for other positioning methods than GNSS based positioning method, like standalone methods that are based on the location of access stations.

RAN-based Notification Area (RNA) is a concept introduced in 5G. When the UE changes its current camped-on cell located within one RNA area to a new cell that is located within another RNA area, the UE needs to report a change of the RNA area.

Small Data Transmission (SDT) refers to data transmission of the UE in RRC Idle state or RRC Inactive state.

PRS configuration may comprise information indicating for example occupied frequency resources in time and frequency, PRS comp pattern, PRS repetition periodicity, PRS muting timing. In connection with PRS configuration the following speicifcations may be referred to: TS 138 211 v16 for physical layer definition, TS 138 214 v16 for procedures and TS 138 215 v16 for measurements.

Camped-on cell: wireless device or UE is registered to a cell of a radio access network which may be referred to a camped-on cell. The camped-on cell is selected by the UE based on a cell selection/cell reselection process. The cell selection and cell reselection may be performed by the UE based on RRC_IDLE or RRC_INACTIVE state measurements and cell selection criteria. Further about cell selection and cell reselection may be referred to in 3GPP TS 38.133 version 15.3.0 Release 15 Section 4.

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. A person skilled in the art appreciates that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof. The communication network or the radio access architecture may also be a future network or architecture, being planned and/or specified, such as so called 6G network/radio access architecture.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1. The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access and Mobility Management Function (AMF).

The user device, also called a user equipment (UE), a user terminal, a terminal device, a wireless device, a mobile station (MS) etc., illustrates one type of an apparatus to which resources on the air interface are allocated and assigned, and thus any feature described herein with a user device may be implemented with a corresponding network apparatus, such as a relay node, an eNB, and an gNB. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. Accordingly, the user device may be an IoT-device. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. The access nodes of the radio network form transmission/reception (TX/Rx) points (TRPs), and the UEs are expected to access networks of at least partly overlapping multi-TRPs, such as macro-cells, small cells, pico-cells, femto-cells, remote radio heads, relay nodes, etc. The access nodes may be provided with Massive MIMO antennas, i.e. very large antenna array consisting of e.g. tens or hundreds of antenna elements, implemented in a single antenna panel or in a plurality of antenna panels, capable of using a plurality of simultaneous radio beams for communication with the UE. The UEs may be provided with MIMO antennas having an antenna array consisting of plurality of antenna elements a.k.a. patches, implemented in a single antenna panel or in a plurality of antenna panels. Thus, the UE may access one TRP using one beam, one TRP using a plurality of beams, a plurality of TRPs using one (common) beam or a plurality of TRPs using a plurality of beams.

5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHZ, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (e.g. in a distributed unit, DU) and non-real time functions being carried out in a centralized manner (e.g. in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize non-terrestrial nodes 106, e.g. access nodes, to enhance or complement the coverage of 5G service, for example by providing backhauling, wireless access to wireless devices, service continuity for machine-to-machine (M2M) communication, service continuity for Internet of Things (IOT) devices, service continuity for passengers on board of vehicles, ensuring service availability for critical communications and/or ensuring service availability for future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or High Altitude Platforms Stations (HAPSs). Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node 104 or by a gNB located on-ground or in a satellite.

A person skilled in the art appreciates that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells, or so-called small cells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

The actual user and control data from network to the UEs is transmitted via downlink physical channels, which in 5G include Physical downlink control channel (PDCCH) which carries the necessary downlink control information (DCI), Physical Downlink Shared Channel (PDSCH), which carries the user data and system information for user, and Physical broadcast channel (PBCH), which carries the necessary system information to enable a UE to access the 5G network.

The user and control data from UE to the network is transmitted via uplink physical channels, which in 5G include Physical Uplink Control Channel (PUCCH), which is used for uplink control information including HARQ feedback acknowledgments, scheduling request, and downlink channel-state information for link adaptation, Physical Uplink Shared Channel (PUSCH), which is used for uplink data transmission, and Physical Random Access Channel (PRACH), which is used by the UE to request connection setup referred to as random access.

Frequency bands for 5G NR are separated into two frequency ranges: Frequency Range 1 (FR1) including sub-6 GHz frequency bands, i.e. bands traditionally used by previous standards, but also new bands extended to cover potential new spectrum offerings from 410 MHz to 7125 MHZ, and Frequency Range 2 (FR2) including frequency bands from 24.25 GHz to 52.6 GHz. Thus, FR2 includes the bands in the mmWave range, which due to their shorter range and higher available bandwidth require somewhat different approach in radio resource management compared to bands in the FR1.

Coverage is a fundamental aspect of cellular network deployments. As NR moves to higher frequencies (around and above 4 GHz for FR1 deployments and above 24 GHz for FR2), propagation conditions degrade compared to lower frequencies, thereby causing further coverage challenges. Mobile operators typically try to solve the problem by increasing the densification of cells by including different types of network nodes in their deployments. While the deployment of regular full-stack cells is preferred, it may not be always a possible (e.g., due to non-availability of backhaul) or economically viable option.

Figure 2:
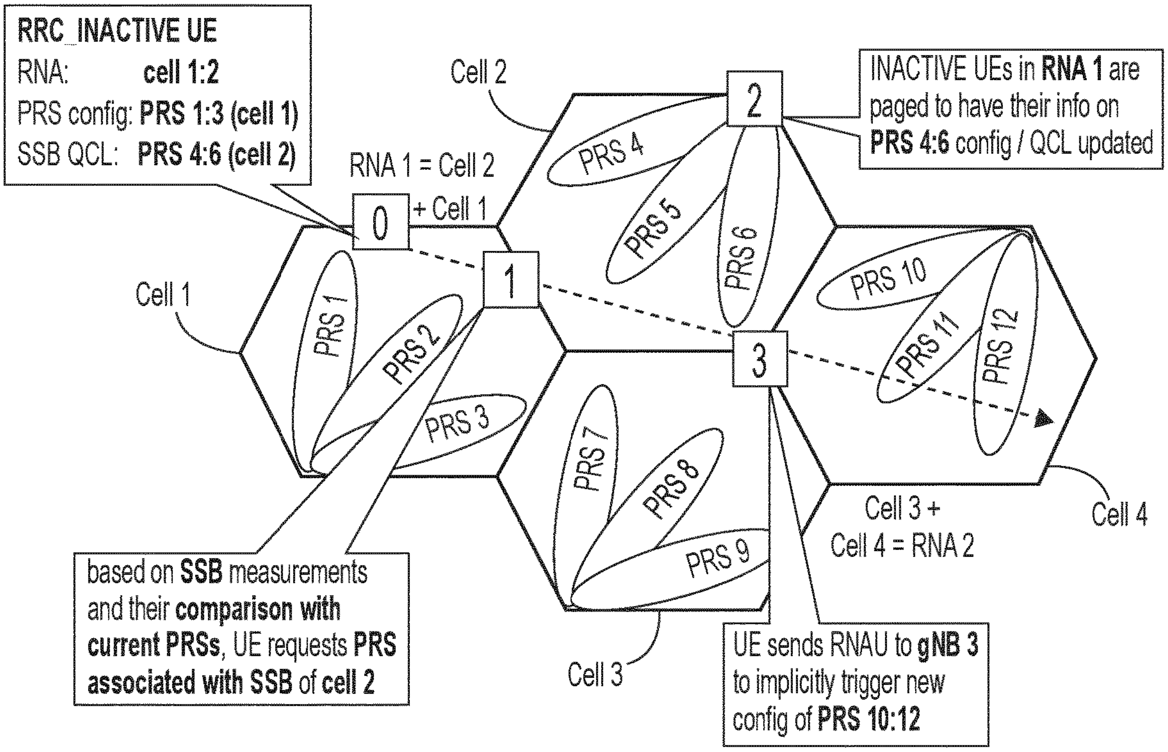
FIG. 2 and FIG. 3 illustrate example scenarios for updating positioning assistance data at a wireless device.
Figure 3:
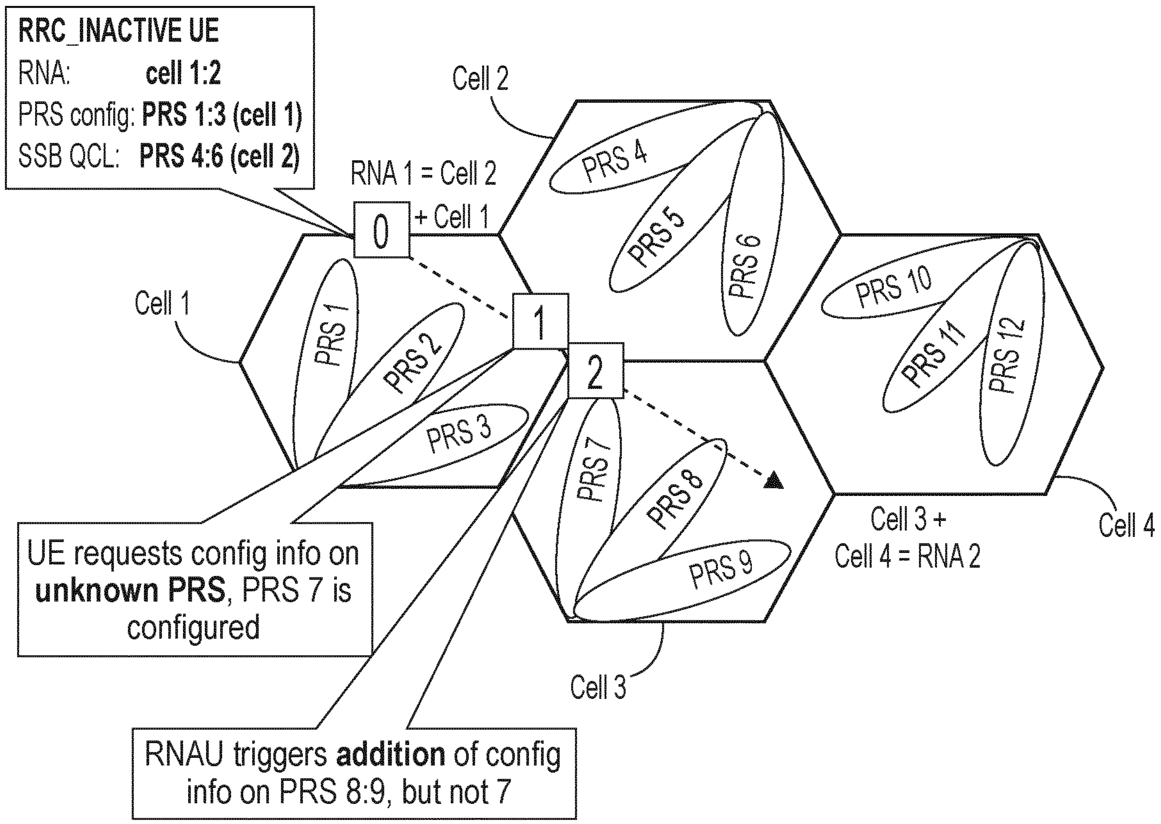

FIG. 2 and FIG. 3 illustrate example scenarios for updating assistance data at a wireless device. The UE and network functionalities for updating AD at UE are at least partially applied in the scenarios described with FIG. 2 and FIG. 3. The example scenarios comprise UE located within a service area of a radio access network (RAN) that comprises cells 'Cell 1', 'Cell 2', 'Cell 3', 'Cell 4' for serving the UE. Each of the cells have PRS configurations that the UE may receive and positioning the UE. PRS configuration of the 'Cell 1' has three PRSs 'PRS 1', 'PRS 2', 'PRS 3'. PRS configuration of the 'Cell 2' has three PRSs 'PRS 4', 'PRS 5', 'PRS 6'. PRS configuration of the 'Cell 3' has three PRSs 'PRS 7', 'PRS 8', 'PRS 9'. PRS configuration of the 'Cell 4' has three PRSs 'PRS 10', 'PRS 11', 'PRS 12'. 'Cell 1' and 'Cell 2' belong to RAN Notification Area 1 'RNA 1' and 'Cell 3' and 'Cell 4' belong to RAN Notification Area 2 'RNA 2'. The cells may be provided by one or more gNBs. On the other hand cells of RNA 1 may be provided by one gNB and cells of RNA 2 may be provided by another gNB. On the other hand all the cells may be provided by different gNBs.

Referring now to the example scenario of FIG. 2, the UE is first located at position '0' and moved from the position '0' towards the area of 'RNA 2' and to 'Cell 4'. The UE is configured with information on 'RNA 1' as well as PRS resources, 'PRS 1', 'PRS 2', 'PRS 3', of 'Cell 1'. In addition, the UE has information on SSB QCL of, 'PRS 4', 'PRS 5', 'PRS 6', of 'Cell 2' but the concrete configuration of these PRS resources is unknown. At position '0', the UE transmits an RNAU message or an SDT message carrying information about indicating a selection of a new camped-on cell. The RNAU message or DT message may be triggered at the UE based on a need for AD update at the UE. The need may be determined based on one or more events for example the UE detecting a strong SSB signals from 'Cell 2' and/or a degraded quality of one or more PRSs, 'PRS 1', 'PRS 2' or 'PRS 3' of 'Cell 1'. For example, the UE may request PRS reconfiguration from 'Cell 2' provided SSB signals of 'Cell 2' have better quality than active PRS resources from 'Cell 1'. The gNB providing the 'Cell 2' may check PRS configuration of the UE by retrieving a context of the UE from the gNB providing the 'Cell 1'. The gNB providing the 'Cell 2' may further check whether the UE has information of PRSs of 'Cell 2'. If the UE does not have information on of PRSs of 'Cell 2', the gNB providing the 'Cell 2' may provide the UE with the information of the PRSs of 'Cell 2'. When entering 'RNA 2', the UE may issue an RNA update. The RNA update may be received by gNB providing the 'Cell 2' and cause the gNB providing a cell, in this case the 'Cell 3' or 'Cell 4', to the UE within the 'RNA 2' to check a PRS configuration of the UE by retrieving a context of the UE from a gNB providing a source cell of the UE, in this case the 'Cell 1' or 'Cell 2', within the 'RNA 1'. The gNB providing the cell, in this case the 'Cell 3' or 'Cell 4', to the UE within the 'RNA 2' may further check whether the UE has information of PRSs of the gNB, in this case the 'Cell 3' or 'Cell 4'. If the UE does not have information of PRSs of the gNB, the gNB may provide the UE with the information of the PRSs.

Referring now to the example scenario of FIG. 3, the UE is first located at position '0' and moved from the position '0' towards the area of 'RNA 2' and to 'Cell 4'. The UE is configured with information on 'RNA 1' as well as PRS resources, 'PRS 1', 'PRS 2', 'PRS 3', of 'Cell 1'. In addition, the UE has information on SSB QCL of 'PRS 4', 'PRS 5', 'PRS 6', of 'Cell 2' but the concrete configuration of these PRS resources is unknown. When approaching 'Cell 3', the quality of PRS of 'Cell 1' degrades which is detected at the UE and causes the UE to trigger an update of PRS configuration by transmitting an SDT message or an RNAU message. The target gNB, in this case the gNB providing 'Cell 3' adds the information on 'PRS 7' of 'Cell 3' to PRS configuration of the UE and transmits an AD update to the UE comprising the information on 'PRS 7' to the UE or the PRS configuration as AD update to the UE. After the UE has moved from 'RNA 1' to 'RNA 2' by crossing the RNA boundary at position 2 in FIG. 3, the UE may perform an RNA update which triggers at the gNB of the 'Cell 3' the addition of configuration information related to 'PRS 8' and 'PRS 9' of 'Cell 3' to the PRS configuration of the UE and transmits the PRS configuration now comprising the configuration information related to 'PRS 8' and 'PRS 9' of 'Cell 3' to the UE. The RNA update may be received by gNB providing the 'Cell 3' and cause the gNB to check a PRS configuration of the UE by retrieving a context of the UE from a gNB providing a source cell of the UE, in this case the gNB providing 'Cell 1' or 'Cell 2', within the 'RNA 1'. Based on the check the gNB may determine that the PRS configuration of the UE already includes the PRS 7 of 'Cell 3', whereby addition of the configuration information related to the PRS 8 and PRS 9 is sufficient to add to the PRS configuration and information on PRS 7 is not included again.

In one further implementation example, the RNA update that indicates UE positioning activity as described herein, the indication may be included in the ResumeCause of RRCResumeRequest message. As an example, the ResumeCause that indicates that UE requests positioning specific information from network or indicates that UE performs RNA update for positioning purposes. The indication may comprise a specific cause value (ResumeCause) may be referred as rna-Update-AD-request or with other cause name indicating that UE performs RNA update and requests positioning AD from network. Examples of the other cause names comprise an on-demand PRS or a PRS configuration request with added rna-Update or just a PRS-request that indicates that UE does not update the RNA but requests the AD (e.g. PRS configuration). In one alternative, sending PRS request (or any other cause value indicating that UE request assistance data update for positioning purposes) as resumeCause to new cell in new RNA may be considered as implicit RNAupdate with PRS request. The UE message with these fields may be interpreted by the network that UE does not wish to resume to the RRC CONNECTED state, but request new PRS (and/or update the RNA). In some examples, UE may be configured to transmit an RRCResumeRequest message with resumeCause indicating a request for positioning assistance data update. The UE may be in RRC Idle or Inactive state and the UE may not want to enter RRC Connected state for receiving an positioning AD update. In some examples, UE may be configured to transmit RRCResumeRequest message with resumeCause indicating a request for positioning assistance data update which may cause UE to enter RRC Connected state for assistance data reception. In some examples, UE may be configured to transmit an RRCResumeRequest message with resumeCause indicating a request for positioning assistance data update and an update of RAN notification area. In some examples, UE may be configured to transmit RRCResumeRequest message with resumeCause (or resume cause value) indicating a request for positioning assistance data update and update of RAN notification area which may cause UE to enter to RRC Connected state (e.g. for receiving the assistance data). In some examples, UE may indicate by using a specific resume cause value or the resume cause value may indicate whether UE requests to resume the connection (transit to RRC Connected state). In some examples, the RRCResumeRequest resume cause value may indicate one or more of or at least one of:

- UE requests to resume the RRC connection,
- UE updates the RAN notification area (UE updates that it enters a new notification area),
- UE request update for positioning assistance data (e.g. update of PRS configuration). As an example, UE may send RRCResumeRequest with a specific cause value ja requests update for positioning assistance data. The request may be transmitted when UE has re-selected a new cell.

In another implementation example, when performing a radio access procedure or an SDT procedure that requests any AD (PRS) update UE shall select the SSB that is suitable for positioning i.e. the quality. As an example, based on the selected SSB index for Radio Access (RA) used for provision of RRCResumeRequest may be interpreted as request for PRS or set of PRS (associated with the SSB group that comprise at least the selected SSB) for the selected SSB.

An example of the RRCResumeRequest message for indicating UE positioning activity in connection with the RNA update, is RRCResumeRequest defined in 38.331 v. 16.4.1 e.g. section 5.3.13.3 describing "Actions related to transmission of RRCResumeRequest or RRCResumeRequest1 message" and Section 6.2.2, that may be updated as follows, where the updates are highlighted by underlining:

RRCResumeRequest message

```
-- ASN1START
-- TAG-RRCRESUMEREQUEST-START
RRCResumeRequest ::= SEQUENCE {
rrcResumeRequest RRCResumeRequest-IEs
}
   RRCResumeRequest-IEs ::= SEQUENCE {
   resumeIdentity ShortI-RNTI-Value,
   resumeMAC-I BIT STRING (SIZE (16)),
   resumeCause ResumeCause,
   spare BIT STRING (SIZE (1))
}
-- TAG-RRCRESUMEREQUEST-STOP
-- ASN1STOP
- ResumeCause
The IE ResumeCause is used to indicate the resume cause in
RRCResumeRequest and RRCResumeRequest1.
ResumeCause information element
-- ASN1START
-- TAG-RESUMECAUSE-START
   ResumeCause ::= ENUMERATED {emergency,
   highPriorityAccess, mt-
   Access, mo-Signalling,
   mo-Data, mo-VoiceCall, mo-VideoCall, mo-SMS, rna-Update, mps-
   PriorityAccess,
   mcs-PriorityAccess, rna-Update-AD-request, AD-request, spare3,
   spare4, spare5 }
-- TAG-RESUMECAUSE-STOP
-- ASN1STOP
```

Figure 4:
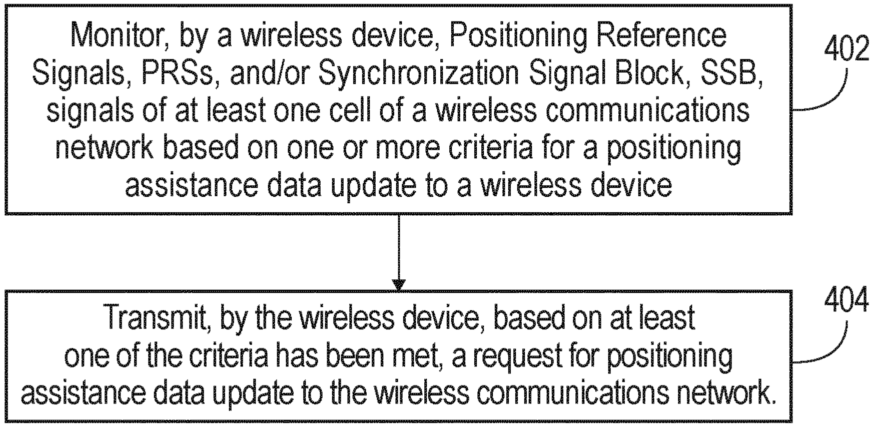
FIG. 4 illustrates an example of a method for supporting delivery of positioning assistance data to a wireless device.

FIG. 4 illustrates an example of a method for supporting delivery of positioning assistance data to a wireless device. The method may be performed by a wireless device or a part of a wireless device. The wireless device may be configured to communicate with an access network node.

Phase 402 comprises monitoring Positioning Reference Signals, PRSs, and/or Synchronization Signal Block, SSB, signals of at least one cell of a wireless communications network based on one or more criteria for a positioning assistance data update to a wireless device.

Phase 404 comprises transmitting, based on at least one of the criteria has been met, a request for positioning assistance data update to the wireless communications network.

After the request has been transmitted to the wireless communications network in phase 404, e.g. an access node of the radio access network, the wireless device may receive a positioning assistance data update from the network, or the access node, whereby the transmission of the request supports delivery of the positioning assistance data to the wireless device.

In an example phase 402 comprises that the monitored PRSs are based on a PRS configuration of the at least one cell and/or SSB signals quasi co-located with the PRSs of the PRS configuration. The PRSs and/or SSB signals may be of camped-on cell of the wireless device, of neighboring cells of the wireless device or of both the camped-on cells and neighboring cells.

In an example phase 404 comprises that the request for positioning assistance data update comprises a Small Data Transmission or a Radio Access Network based Notification Area Update.

In an example phase 404 comprises that the request for positioning assistance data update comprises a Radio Access Network based Notification Area Update comprising a cause value indicating the positioning assistance data update.

In an example phases 402, 404 and 406 comprise that the wireless device has a Radio Resource Control protocol state Idle, Inactive or Connected.

In an example, phase 404 comprises transmitting the request for positioning assistance data update on each cell re-selection.

In an example phases 404 comprises that the request for positioning assistance data update comprises information related to at least one of a Radio Resource Control protocol state of the wireless device, measurement results of the monitored PRSs and SSB signals, one or more cell identifiers, one or more RNA identifiers, and a positioning method applied at the wireless device. The information included in the request for positioning assistance data update may be used at the network side, for example an access node, for determining positioning assistance data to be delivered to the wireless device. For example, the one or more cell identifiers and one or more RNA identifiers may indicate in which cells the wireless device is interested.

Figure 5:
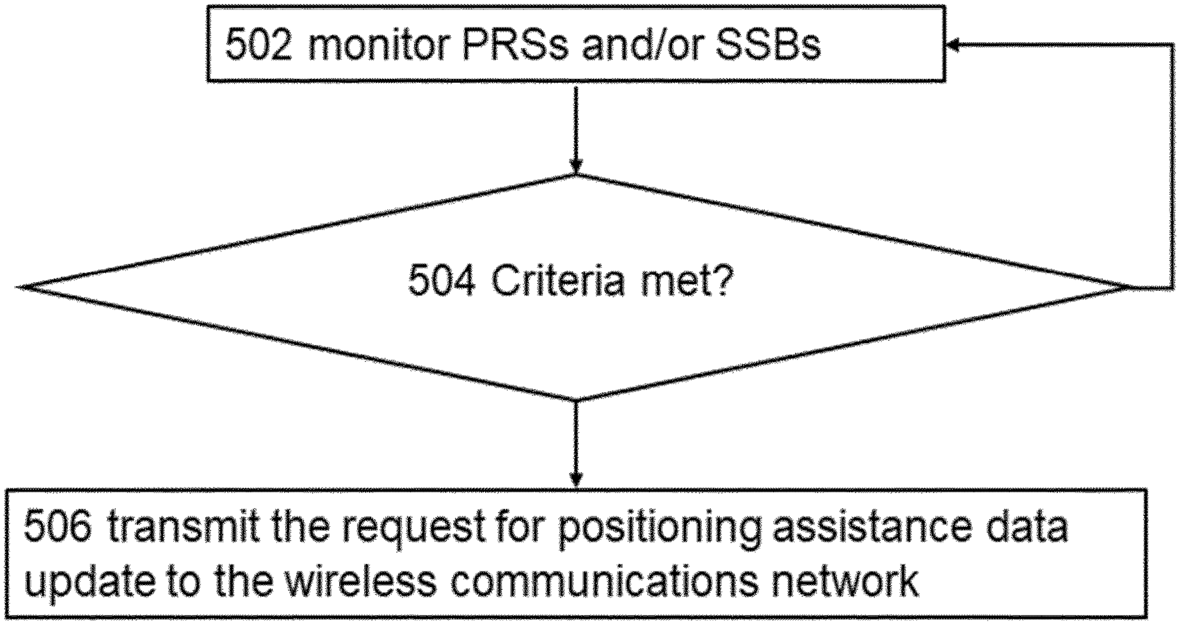
FIG. 5 illustrates an example of a method for transmitting a request for positioning assistance data.

FIG. 5 illustrates an example of a method for transmitting a request for positioning assistance data. The method may be performed by a wireless device or a part of a wireless device. At least a part of the phases of FIG. 5 may be performed in connection with the method of FIG. 4.

Phase 502 comprises monitoring PRSs in accordance with phase 402.

Phase 504 comprises determining whether the one or more criteria have been met.

Phase 506 comprises transmitting the request for positioning assistance data update to the wireless communications network. Phase 506 may be performed provided that at least one of the criteria have been met in phase 504. Otherwise the method may proceed to phase 502.

In an example, phase 504 comprises that the one or more criteria for a positioning assistance data update to a wireless device comprise at least one of triggering criteria and blocking criteria. The method proceeds to phase 506, when at least one of the triggering criteria have been met without any of the blocking criteria being met. Accordingly, phase 506 may comprise transmitting the request for positioning assistance data update to the wireless communications network based on determining at least one of the triggering criteria have been met without any of the blocking criteria being met.

In an example, phase 504 comprises that the triggering criteria are based on one or more of time, expiry of a periodic timer, a cell selection event, a power level of a monitored SSB signal, a power level of a monitored PRS, a periodicity of a monitored PRS, an occasion duration of a monitored PRS, a need for Radio Access Network Notification Area update, a number of PRS meeting a quality level, positioning accuracy, a change of a UE context and a change of a positioning method.

In an example, phase 504 comprises that the blocking criteria are based on one or more of time, a silence period from a previous assistance data update, a Radio Resource Control protocol state change and a velocity of the wireless device.

Figure 6:
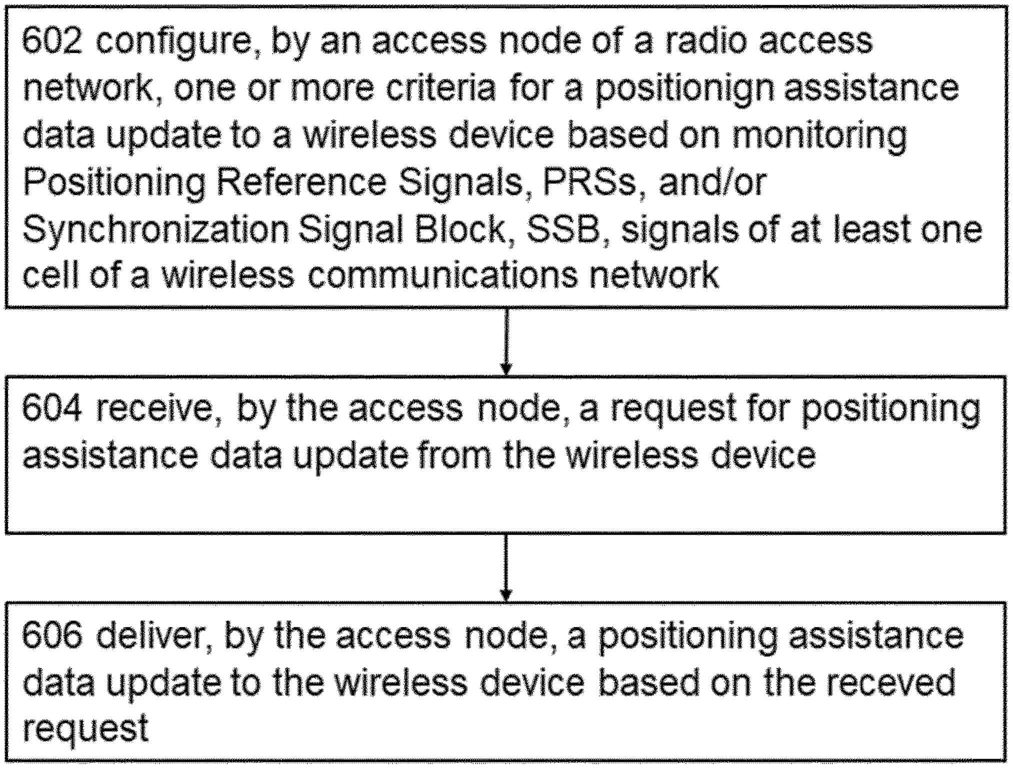
FIG. 6 illustrates an example of a method for supporting positioning assistance data requests by a wireless device.

FIG. 6 illustrates an example of a method for supporting assistance data requests by a wireless device. The method may be performed by an access network node or a part of an access network node. The access network node may be configured to communicate with a wireless device.

Phase 602 comprises configuring one or more criteria for a positioning assistance data update to a wireless device based on monitoring Positioning Reference Signals, PRSs, and/or Synchronization Signal Block, SSB, signals of at least one cell of a wireless communications network.

Phase 604 comprises receiving a request for positioning assistance data update from the wireless device.

Phase 606 comprises delivering a positioning assistance data update to the wireless device based on the received request.

Figure 7:
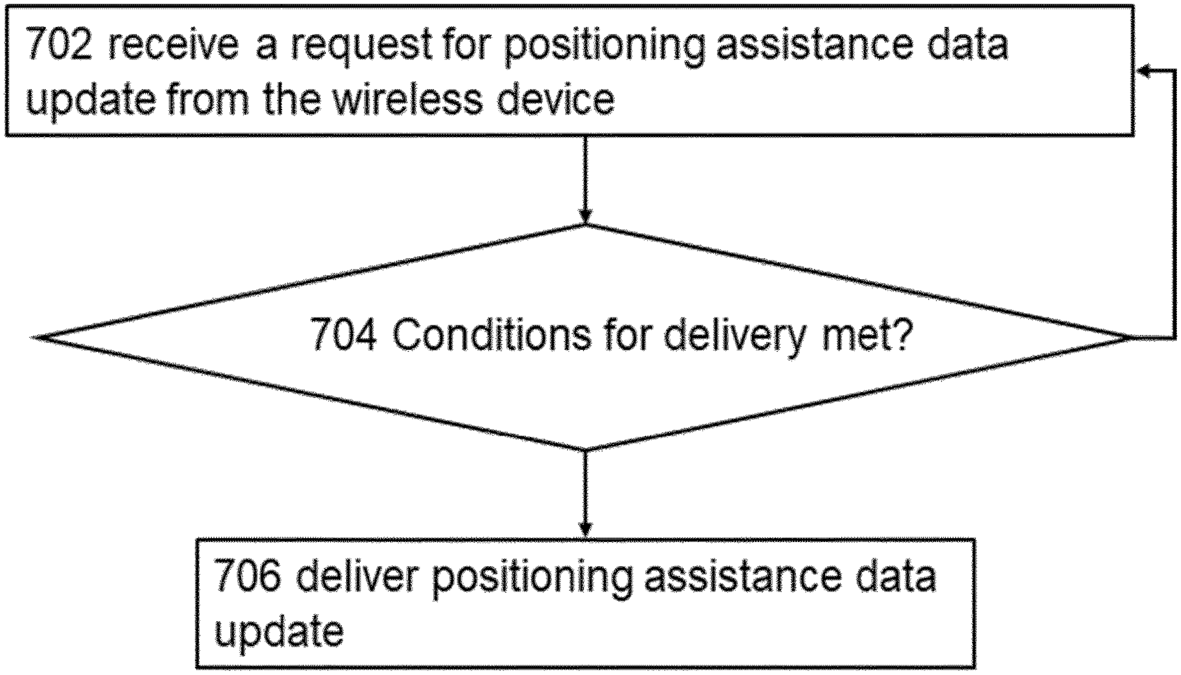
FIG. 7 illustrates an example of a method for delivering positioning assistance data.

In an example, phase 606 comprise determining the positioning data update based on the received request. The positioning assistance data update may be included PRS frequency and time resources, and PRS periodicity for one or more cells. The cells may be determined based on interest of the wireless device indicated by information included in the request for positioning assistance data update FIG. 7 illustrates an example of a method for delivering assistance data. The method may be performed by an access network node or a part of an access network node. At least a part of the phases of FIG. 7 may be performed in connection with the method of FIG. 6.

Phase 702 comprises configuring one or more criteria for a positioning assistance data update in accordance with phase 602.

Phase 704 comprises determining whether one or more conditions for approving a request for positioning assistance data update have been met, or the request is approved. The method proceeds to phase 706 if the conditions are met, otherwise the method may proceed to phase 702.

Phase 706 comprises delivering the positioning assistance data update to the wireless device based on a positive approval of the request, or i.e. based on determining to approve the request. The request may be approved based on a result of phase 704.

In an example phase 706 comprises delivering the positioning assistance data update to the wireless device as part of an existing communications session based on determining a current Radio Resource Control protocol state of the wireless device; or deliver the positioning assistance data update to the wireless device as part of a new communications session based on the current Radio Resource Control protocol state of the wireless device or based on a changed Radio Resource Control protocol state of the wireless device.

In an example phase 704 comprises approving the received request for positioning assistance data update based on a lack of response from a location management function and rejected based on a context retrieval after expiry of assistance data has been confirmed based on Radio Access Network based Notification Area Update.

In an example phase 706 comprises delivering positioning assistance data to the wireless device, wherein the positioning assistance data comprises PRS frequency and time resources, and PRS periodicity.

At least part of the steps of the methods described with FIGS. 4 to 7 may be performed in accordance with the described examples of UE and network functionalities and applied in the scenarios described with FIGS. 2 and 3.

The method and the embodiments related thereto may be implemented in an apparatus implementing an access node of a radio access network, a part of an access node of a radio access network, or another network entity, a wireless device or a part of a wireless device. Examples of the apparatus comprise at least a gNB and a wireless device. The apparatus may comprise at least one processor and at least one memory, said at least one memory stored with computer program code thereon, the at least one memory and the computer program code configured to, with the at least one processor, cause the apparatus at least to perform a method described with an example described herein. Such apparatuses may comprise units or components that are configured to carry out one or more functionalities described in connection with any of the FIGS. 1 to 7 for implementing the embodiments.

On the other hand method and the embodiments related thereto may likewise be implemented in an apparatus comprising means for monitoring Positioning Reference Signals, PRSs, and/or Synchronization Signal Block, SSB, signals of at least one cell of a wireless communications network based on one or more criteria for a positioning assistance data update to a wireless device; means for transmitting, based on at least one of the criteria has been met, a request for positioning assistance data update to the wireless communications network. Examples of the apparatus comprise a wireless device or a part of a wireless device.

According to an embodiment, the apparatus comprises means for receiving a positioning assistance data update from the wireless communications network.

According to an embodiment, the apparatus comprises means for transmitting the request for positioning assistance data update to the wireless communications network based on determining at least one of the triggering criteria have been met without any of the blocking criteria being met.

According to an embodiment, the apparatus comprises means for transmitting the request for positioning assistance data update on each cell re-selection.

On the other hand method and the embodiments related thereto may likewise be implemented in an apparatus comprising means for configuring one or more criteria for a positioning assistance data update to a wireless device based on monitoring Positioning Reference Signals, PRSs, and/or Synchronization Signal Block, SSB, signals of at least one cell of a wireless communications network; means for receiving a request for positioning assistance data update from the wireless device; and means for delivering, by the access node, a positioning assistance data update to the wireless device based on the received request. Examples of the apparatus comprise an access node of radio access network or a part of an access node of radio access network.

According to an embodiment, the apparatus comprises means determining the positioning data update based on the received request.

According to an embodiment, the apparatus comprises means for determining to approve the received request for positioning assistance data update based on one or more conditions; and means for delivering the positioning assistance data update based on a positive approval of the request.

According to an embodiment, the apparatus comprises means for delivering the positioning assistance data update to the wireless device as part of an existing communications session based on a current Radio Resource Control protocol state of the wireless device; or means for delivering the positioning assistance data update to the wireless device as part of a new communications session based on the current Radio Resource Control protocol state of the wireless device or based on a changed Radio Resource Control protocol state of the wireless device.

According to an embodiment, the apparatus comprises means for approving, by the access node, the received request for positioning assistance data update based on a lack of response from a location management function and rejected based on a context retrieval after expiry of assistance data has been confirmed based on Radio Access Network based Notification Area Update.

In an exemplary embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In general, the various embodiments of the invention may be implemented in hardware, circuitry or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as UE or gNB, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in/according to one embodiment" or "in/according to an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

List of abbreviations

| | |
|---|---|
| AoD | Angle of Departure |
| DL | Downlink |
| BT | Bluetooth |
| gNB | 5G Base Station |
| DMRS | Demodulation Reference Signal |
| GNSS | Global Navigation Satellite System |
| IoT | Internet of Things |
| LAN | Local Area Network |
| LMF | Location Management Function |
| LOS | Line of Sight |
| LPP | LTE Positioning Protocol |
| NR | New Radio (5G) |
| PBCH | Physical Broadcast Channel |
| PSS | Primary Synchronization Signal |
| PRS | Positioning Reference Signal |
| QCL | Quasi co-location |
| RA | Radio Access |
| RAN | Radio Access Network |
| RRC | Radio Resource Control protocol |
| RS | Reference Signal |
| RSRP | Reference Signal Received Power |
| RSTD | Reference Signal Time Difference |
| RNA | RAN based Notification Area |
| RNAU | RAN based Notification Area Update |
| RTT | Round Trip Time |
| RX | Receive |
| SDT | Small Data Transmission |
| SINR | Signal-to-Noise and Interference Ratio |
| SSS | Secondary Synchronization Signal |
| SRS | Sounding Reference Signal |
| SRS-P | SRS for positioning |
| SSB | Synchronization Signal Block |
| ToA | Time of Arrival |
| TX | Transmit |
| UE | User Equipment |
| UL | Uplink |

The invention claimed is:

1. A user equipment comprising at least one processor and at least one memory, said at least one memory stored with computer program code thereon, the at least one memory and the computer program code configured to, with the at least one processor, cause the user equipment at least to:

monitor Positioning Reference Signals, PRSs, and/or Synchronization Signal Block, SSB, signals of at least one cell of a wireless communications network based on one or more criteria for a positioning assistance data update to the user equipment;

transmit, based on at least one of the criteria having been met, a request for positioning assistance data update to the wireless communications network, the request comprising a Radio Access Network based Notification Area Update including a cause value indicating the wireless device requires positioning assistance data update, the Radio Access Network based Notification Area Update triggered upon a cell re-selection within a same RAN Notification Area while the wireless device is in a Radio Resource Control protocol Inactive state with an ongoing positioning session;

evaluate unknown Positioning Reference Signal, PRS, resources with indicated Synchronization Signal Block, SSB, quasi co-location information by performing substitution measurements of the quasi co-located SSB signals, wherein the request for positioning assistance data update is transmitted based on the substitution measurements indicating a need for configuration information of the unknown PRS resources; and receive, in response to the request for positioning assistance data update, one of: a positioning assistance data update, or an indication to use the same positioning assistance data configuration.

2. The user equipment according to claim 1, wherein the monitored PRSs are based on a PRS configuration of the at least one cell and/or SSB signals quasi co-located with the PRSs of the PRS configuration.

3. The user equipment according to claim 1, wherein the request for positioning assistance data update comprises a Small Data Transmission or a Radio Access Network based Notification Area Update.

4. The user equipment according to claim 3, wherein the Radio Access Network based Notification Area Update comprises a cause value indicating the positioning assistance data update.

5. The user equipment according to claim 1, wherein the wireless device has a Radio Resource Control protocol state Idle, Inactive or Connected.

6. The user equipment according to claim 1, wherein the one or more criteria for a positioning assistance data update to a wireless device comprise at least one of triggering criteria and blocking criteria.

7. The user equipment according to claim 6, caused to:

transmit, by the wireless device, the request for positioning assistance data update to the wireless communications network based on determining at least one of the triggering criteria have been met without any of the blocking criteria being met.

8. The user equipment according to claim 6, wherein the triggering criteria are based on a positioning method a combination of at least two triggering criteria comprising:

at least two of: a power level of a monitored SSB signal being stronger than a currently measured PRS of a different cell, a periodicity of a monitored PRS not matching an actually measured periodicity, an occasion duration of a monitored PRS not matching a configured value, a number of PRSs meeting a quality level being less than a minimum required number, or active PRS resources from a number of cells meeting a minimum quality becoming less than a minimum number within an expiry time of the positioning assistance data; and at least one of: a need for Radio Access Network Notification Area update triggered within a same RAN Notification Area, or a change of a positioning method.

9. The user equipment according to claim 6, wherein the blocking criteria are based on a combination of:

a silence period from a previous positioning assistance data update;

an expected or ongoing Radio Resource Control protocol state change; and a velocity of the user equipment exceeding a maximum threshold.

10. The user equipment according to claim 1, caused to:

transmit, by the wireless device, the request for positioning assistance data update on each cell re-selection.

11. The user equipment according to claim 1, wherein the request for positioning assistance data update comprises information related to at least one of a Radio Resource Control protocol state of the wireless device, measurement results of the monitored PRSs and/or SSB signals, one or more cell identifiers, one or more RNA identifiers and a positioning method applied at the wireless device.

12. An apparatus comprising at least one processor and at least one memory, said at least one memory stored with computer program code thereon, the at least one memory and the computer program code configured to, with the at least one processor, cause the apparatus at least to:

configure, by an access node of a radio access network, one or more criteria for a positioning assistance data update to a wireless device based on monitoring Positioning Reference Signals, PRSs, and/or Synchronization Signal Block, SSB, signals of at least one cell of a wireless communications network;

receive, by the access node, a request for positioning assistance data update from the wireless device; and deliver, by the access node, a positioning assistance data update to the wireless device based on the received request, the apparatus further caused to:

reject, by the access node, the received request for positioning assistance data update based on a lack of response from a network entity and approved based on a context retrieval after expiry of assistance data has been confirmed based on Radio Access Network based Notification Area Update.

13. The apparatus according to claim 12, caused to:

determine, by the access node, to approve the received request for positioning assistance data update based on one or more conditions; and deliver, by the access node, the positioning assistance data update based on a positive approval of the request.

14. The apparatus according to claim 12, caused to:

deliver, by the access node, the positioning assistance data update to the wireless device as part of an existing communications session based on a current Radio Resource Control protocol state of the wireless device; or deliver, by the access node, the positioning assistance data update to the wireless device as part of a new communications session based on the current Radio Resource Control protocol state of the wireless device or based on a changed Radio Resource Control protocol state of the wireless device.

15. A user equipment method, comprising monitoring Positioning Reference Signals, PRSs, and/or Synchronization Signal Block, SSB, signals of at least one cell of a wireless communications network based on one or more criteria for a positioning assistance data update to the user equipment;

transmitting, based on at least one of the criteria has been met, a request for positioning assistance data update to the wireless communications network, the request comprising a Radio Access Network based Notification Area Update including a cause value indicating the wireless device requires positioning assistance data update, the Radio Access Network based Notification Area Update triggered upon a cell re-selection within a same RAN Notification Area while the wireless device is in a Radio Resource Control protocol Inactive state with an ongoing positioning session;

evaluating, unknown Positioning Reference Signal, PRS, resources with indicated Synchronization Signal Block, SSB, quasi co-location information by performing substitution measurements of the quasi co-located SSB signals, wherein the request for positioning assistance data update is transmitted based on the substitution measurements indicating a need for configuration information of the unknown PRS resources; and receiving, in response to the request for positioning assistance data update, one of: a positioning assistance data update, or an indication to use the same positioning assistance data configuration.

16. The user equipment according to claim 2, wherein the user equipment is further caused to:

evaluate, by the wireless device, unknown Positioning Reference Signal, PRS, resources with indicated Synchronization Signal Block, SSB, quasi co-location information by performing substitution measurements of the quasi co-located SSB signals, wherein the unknown PRS resources comprise PRS resources for which configuration information is not available to the wireless device; and transmit the request for positioning assistance data update based on the substitution measurements indicating that the quasi co-located SSB signals have a signal quality exceeding a currently measured PRS, thereby indicating a need for configuration information of the unknown PRS resources.

17. The user equipment according to claim 4, wherein:

the wireless device is in a Radio Resource Control protocol Inactive state with an ongoing positioning session;

the Radio Access Network based Notification Area Update is triggered upon each cell re-selection within a same RAN Notification Area;

the cause value comprises an rna-Update-AD-request or an AD-request in a ResumeCause of an RRCResumeRequest message; and the user equipment is further caused to receive, by the wireless device, in response to the Radio Access Network based Notification Area Update, one of: a positioning assistance data update, or an indication to use the same positioning assistance data configuration.

18. The user equipment according to claim 8, wherein the at least two triggering criteria comprise:

a power level of a monitored SSB signal of a first cell being stronger than a currently measured PRS of a second cell different from the first cell;

a periodicity of a monitored PRS not matching an actually measured periodicity; and a need for Radio Access Network Notification Area update triggered within a same RAN Notification Area based on a cell re-selection event.

19. The user equipment according to claim 9, wherein the at least two blocking criteria comprise:

a silence period from a previous positioning assistance data update, wherein the request for positioning assistance data update is transmitted only after the silence period has expired;

an expected or ongoing Radio Resource Control protocol state change; and a velocity of the wireless device exceeding a maximum UE velocity threshold.

20. The user equipment according to claim 7, wherein:

the triggering criteria comprise a number of PRS resources meeting a minimum quality level being less than a required number and a periodicity of a monitored PRS not matching an actually measured periodicity; and the blocking criteria comprise a silence period from a previous positioning assistance data update and a velocity of the wireless device exceeding a maximum UE velocity threshold.

* * * * *